US007481957B1

(12) United States Patent
Adickes

(10) Patent No.: US 7,481,957 B1
(45) Date of Patent: Jan. 27, 2009

(54) METHODS FOR MAKING ARCHITECTURAL GLASS PANELS WITH EMBEDDED OBJECTS

(75) Inventor: Eric Adickes, Capistrano Beach, CA (US)

(73) Assignee: 3form, Salt Lake City, UT (US)

( * ) Notice: Subject to any disclaimer, the term of this patent is extended or adjusted under 35 U.S.C. 154(b) by 0 days.

(21) Appl. No.: 11/242,998

(22) Filed: Oct. 4, 2005

Related U.S. Application Data

(62) Division of application No. 11/061,423, filed on Feb. 18, 2005, now abandoned.

(60) Provisional application No. 60/606,364, filed on Sep. 1, 2004.

(51) Int. Cl.
   *B29C 65/54* (2006.01)
   *B32B 37/00* (2006.01)
   *B44C 5/06* (2006.01)
   *B32B 17/10* (2006.01)

(52) U.S. Cl. ...................... 264/261; 264/241

(58) Field of Classification Search ................ 264/264, 264/241, 261; 428/13, 431; 156/99
   See application file for complete search history.

(56) References Cited

U.S. PATENT DOCUMENTS

| | | | | |
|---|---|---|---|---|
| 3,212,952 | A * | 10/1965 | Turner | 428/38 |
| 3,703,425 | A | 11/1972 | Delmonte et al. | |
| 3,912,542 | A * | 10/1975 | Hirano et al. | 156/104 |
| 4,234,533 | A * | 11/1980 | Langlands | 264/261 |
| 4,299,639 | A | 11/1981 | Bayer | |
| 4,642,255 | A * | 2/1987 | Dlubak | 428/38 |
| 5,219,630 | A * | 6/1993 | Hickman | 428/38 |
| 5,306,535 | A * | 4/1994 | Shaffer | 428/38 |
| 5,445,890 | A | 8/1995 | Bayha et al. | |

(Continued)

FOREIGN PATENT DOCUMENTS

JP          08268801          10/1996

(Continued)

OTHER PUBLICATIONS

USPTO Office Action for U.S. Appl. No. 11/061,423, filed Feb. 18, 2005, (paper No. 20050816, mailed Sep. 2, 2005); 11 pgs.

(Continued)

*Primary Examiner*—Monica A Huson
*Assistant Examiner*—Patrick Butler
(74) *Attorney, Agent, or Firm*—Workman Nydegger

(57) ABSTRACT

A decorative architectural glass panel comprises a two or more glass sheets separated by a resin in which one or more decorative objects are suspended. A method of making the glass panel comprises positioning one or more spacers and one or more decorative objects on a first glass sheet, placing a second glass sheet about the first glass sheet, sealing the edges of the first glass sheet and second glass sheet, and filling the space between the first and second glass sheets with a curable liquid resin. The resin can be poured using a substantially horizontal pour in order to keep the decorative objects from substantially shifting when pouring the liquid resin. The resin can also be poured in combination with a vacuum force. In some implementations, the glass panel may also be substituted with a resin panel using polymeric resin sheets.

23 Claims, 5 Drawing Sheets

U.S. PATENT DOCUMENTS 5,944,862 A * 8/1999 Howes ................ 65/60.3
6,322,862 B1 * 11/2001 Sakai ................ 428/13
7,008,700 B1 * 3/2006 Goodson et al. ......... 428/542.2

FOREIGN PATENT DOCUMENTS

| JP | 08268801 A | * | 10/1996 |
|---|---|---|---|
| JP | 08309914 | | 11/1996 |
| JP | 08309914 A | * | 11/1996 |
| JP | 2004307279 A | * | 11/2004 |
| WO | WO 01/63324 A2 | * | 8/2001 |

OTHER PUBLICATIONS

USPTO Office Action for U.S. Appl. No. 11/061,423, filed Feb. 18, 2005, (paper No. 20051212, mailed Dec. 19, 2005); 12 pgs.

* cited by examiner

METHODS FOR MAKING ARCHITECTURAL GLASS PANELS WITH EMBEDDED OBJECTS

CROSS-REFERENCE TO RELATED APPLICATIONS

This application is a divisional patent application of U.S. patent application Ser. No. 11/061,423, filed on Feb. 18, 2005 now abandoned, entitled "Architectural Glass Panels with Embedded Objects and Methods for Making," which claims the benefit of priority to U.S. Provisional Patent Application No. 60/606,364, filed on Sep. 1, 2004, also entitled "Architectural Glass Panels with Embedded Objects and Methods for Making the Same." The entire content of each of the aforementioned patent applications is incorporated herein by reference.

BACKGROUND OF THE INVENTION

1. The Field of the Invention

The present invention relates generally to decorative glass and resin products and processes, for use in architectural design and construction.

2. Background and Relevant Art

Recent architectural designs have focused on decorative panels, such as glass or polymeric resin panels, which can be used in a wide variety of environments in a wide variety of embodiments, such as decorative windows, and as partitions in offices and homes, and so forth. In general, suitable architectural polymeric resin materials (or, "resins") for use in decorative panels comprise polyvinyl chloride, acrylic, poly (methylmethacrylate) or "PMMA", poly(ethylene-co-cyclohexane 1,4-dimethanol terephthalate) or "PETG", as well as related polycarbonates.

Glass and resin materials each have a number of unique advantages that make them respectively useful for certain applications. For example, polymeric resin materials tend to be more malleable, better suited for large-scale, decorative production techniques, and less expensive than conventional glass. Resin materials are also often used in a number of applications where the appearance of glass (e.g., translucence or transparence) or other properties of glass is desired.

Conventional glass also has its own set of properties that make it a unique decorative architectural material. For example, glass has a particular optical clarity and physical rigidity that is noticeably different from many conventional polymeric resins. By contrast with resin materials, however, glass cannot ordinarily be heated and pressed using conventional thermosetting processes to include decorative objects or patterns. In particular, decorative glass tends to crack or blemish at many of the conventional temperatures and pressures that are otherwise used to set multiple resin sheets together into a single panel.

As such, one method for making a conventional, decorative glass panel comprises placing two glass sheets at opposing sides of a relatively thin decorative object, placing relatively thin two-sided tape around the peripheral edges between the two opposing glass sheets, and inserting a curable resin between the glass sheets. To pour the resin, the manufacturer perforates the tape, and pours the curable resin from top to bottom, as the glass sheets are held in an upright, vertical position. This vertical position helps the liquid resin follow the pull of gravity, and flow easily throughout the cavity between the two glass sheets. At the same time, the vertical position helps any air bubbles between the two sheets float toward the top of the pour.

Unfortunately, this method of pouring liquid resin in a vertical direction is fairly limited to thinly-spaced, opposing glass sheets (e.g., the thickness of the two-sided tape) that can be pressed against relatively flat decorative objects (e.g., the thickness of the two-sided tape, or less). That is, the vertical pour method relies in part on decorative objects that will not move when the glass sheets are held in an upright position. For example, just as any air bubbles tend to float to the top when the manufacturer pours the liquid resin in a vertical pour, the decorative object between the opposing glass sheets may slide to the bottom if it is not tightly held, or float upward on top of the resin. This may prohibit a manufacturer from attempting to suspend unevenly-sized decorative objects between opposing glass sheets.

By contrast, horizontally pouring the resin into the cavity between the opposing glass sheets, rather than pouring vertically, can create other difficulties that make conventional glass difficult to use. For example, rather than positioning the two glass sheets upright, the manufacturer may simply pour the curable liquid resin between the glass sheets as they lay flat on a support surface. Unfortunately, this horizontal position makes it difficult to adequately distribute the liquid resin throughout the space between the two opposing glass sheets evenly.

Furthermore, air bubbles are likely to be trapped between the opposing glass sheets during a horizontal pour, rather than float away to one side or another. Combined with the relatively high cost of glass, imperfections resulting from imperfect pours, or trapped air bubbles, make horizontal pours relatively impractical for large-scale manufacturing purposes. Thus, conventional glass panels are limited to being relatively thin, or having relatively thin, evenly-sized decorations included inside.

Accordingly, an advantage in the art can be realized with methods and apparatus that allow a manufacturer to create decorative glass panels that avoid one or more of the foregoing problems in the art. In particular, an advantage in the art can be realized with methods and apparatus that allow a manufacturer to include a wide variety of decorative objects, beyond simply flat, evenly-sized patterns, between opposing glass sheets.

BRIEF SUMMARY OF THE INVENTION

The present invention solves one or more of the foregoing problems in the prior art with methods and apparatus for creating decorative architectural glass panels that include any type of decorative objects embedded inside. In particular, implementations of the present invention include positioning two or more glass sheets together about one or more decorative objects, and then inserting a curable resin using a substantially horizontal pour.

In one implementation, a manufacturer lays a first glass sheet against a support surface, and then places one or more spacers about the periphery of the first glass sheet. The manufacturer then arranges one or more decorative objects on the first glass sheet between the spacers, and registers a second glass sheet over the first glass sheet. Thereafter, the manufacturer positions blocking means about the periphery of the first and second glass sheet, such that the blocking means do not prohibit removal of the one or more spacers. The manufacturer can then apply a viscous sealant, such as a silicone or urethane-based sealant, about the periphery of the first and second glass sheets.

When the first and second glass sheets are blocked and sealed appropriately, the manufacturer can create one or more pores in the sealant, and then pour the curable resin through the one or more pores in a substantially horizontal fashion. This pouring method can ensure that the decorative objects do not move substantially out of an initial position, and can ensure that air bubbles are not trapped between the glass plates. After removing any lingering air bubbles, the glass sheet assembly is then left to cure into a final product.

Additional features and advantages of exemplary implementations of the invention will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods and apparatus for creating decorative architectural glass panels that include any type of decorative objects embedded inside. In particular, implementations of the present invention include positioning two or more glass sheets together about one or more decorative objects, and then inserting a curable resin using a substantially horizontal pour.

Figure 1:
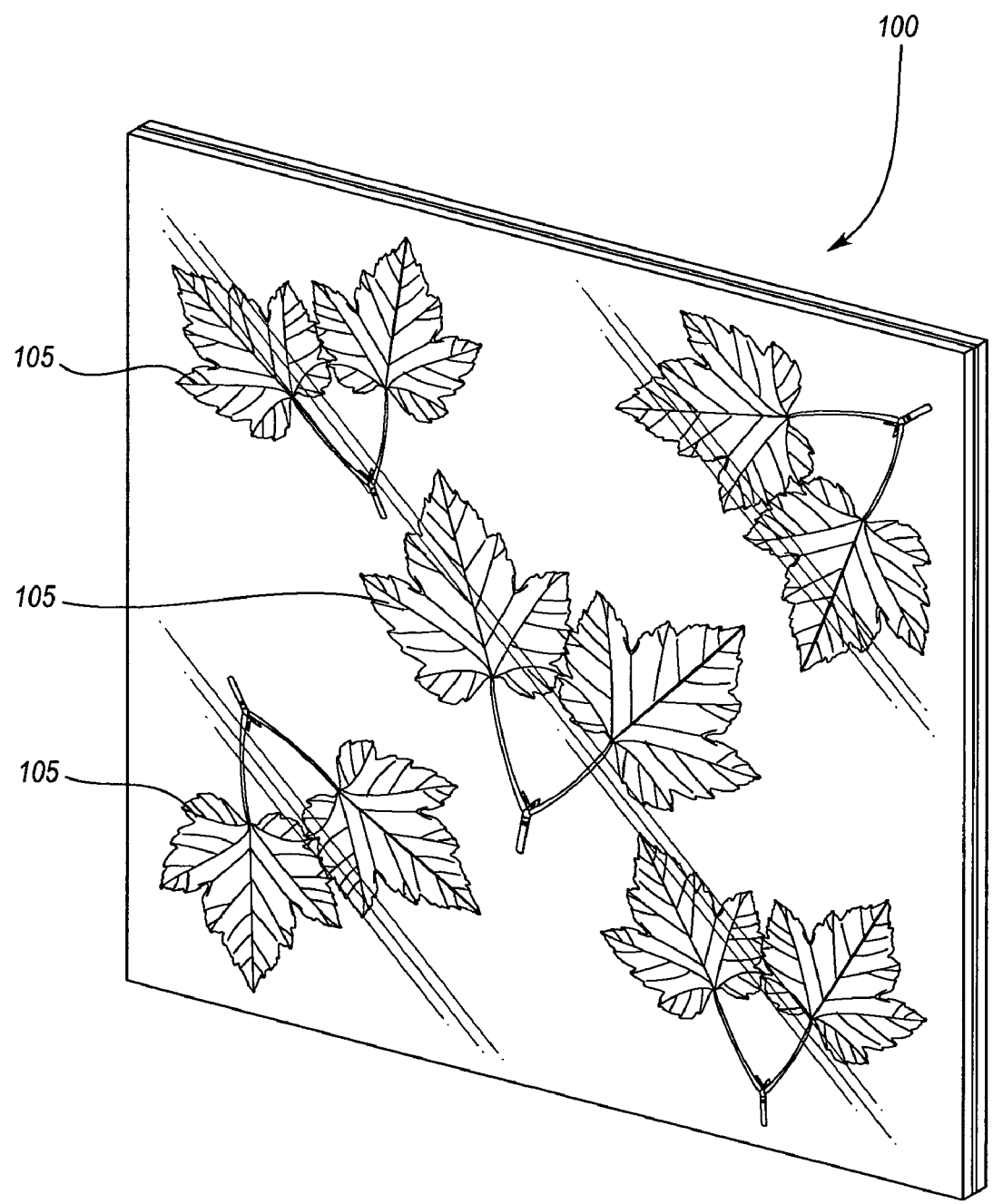
FIG. 1 illustrates one implementation of a decorative architectural glass panel in accordance with the present invention.

For example, FIG. 1 illustrates a decorative architectural glass panel 100 that can be made using the methods and/or apparatus described herein. In particular, a glass panel 100 comprises one or more decorative objects 105 that can be seen through the transparent or translucent glass sheets from virtually any view. For example, the decorative objects 105 can comprise any organic, inorganic, naturally occurring, or synthetic materials such as rocks, crushed glass, minerals, leaves (e.g., objects 105, FIG. 1), twigs, branches, grasses, bamboo shoots, willow, thatch reed, solidified resins, metallic objects, any vegetation or like representation, and so forth.

In some cases, such as if synthetically formed, the decorative objects 105 may appear substantially two-dimensional, such as in the case of silk leaves, silk flowers, naturally-occurring grasses, and the like. In other cases, the dimensions of the decorative objects will be such that they readily appear as three-dimensional objects, such as with crushed rocks, thatch reed, branches or twigs, and the like. Nevertheless, it will be appreciated that essentially all decorative objects will have at least some three-dimensional aspect, despite some objects 105 being relatively flatter or thicker than others.

Continuing with FIG. 1, a glass panel 100 can be used in any building environment where glass materials are desired. For example, the glass panel 100 can be used in an internal architectural environment, such as an office window, a component of an office wall, a component of a floor, a component of a stairway, a bathroom component, and so forth. Alternatively, the glass panel 100 can be used as a decorative building material in appropriate outdoor environments, such as an outdoor window, an outdoor display, a sculpture, and so forth. As such, it will be appreciated that the glass sheets used to make the glass panel 100 can be any size corresponding to the final size of the glass panel 100. For example, in one implementation, first and second glass sheets are each from about 3 feet wide to about 6 feet wide; and from about 5 feet long to about 10 feet long. In another implementation, the first and second glass sheets are each from about 4 feet wide to about 6 feet wide; and from about 13 feet long to about sixteen feet long. Of course, any other appropriate sizes are possible, consistent with the inventive principles disclosed herein.

When preparing the glass panel 100, a manufacturer will typically begin by cleaning the glass sheets used to form the panel by removing any existing oils, such as residual oils. Oils such as these can ultimately contaminate the resins, or other matrix-forming materials, used in between the sheets, resulting in an inferior glass panel product. To clean or remove the potentially harmful residues, one suitable method (not shown) comprises scrubbing both sides of each glass sheet with a polishing abrasive, such as pumice. In one implementation, the manufacturer applies the polishing abrasive using water and steel wool. The manufacturer can then position the glass sheets to form glass panel 100, as described herein.

Figure 2A:
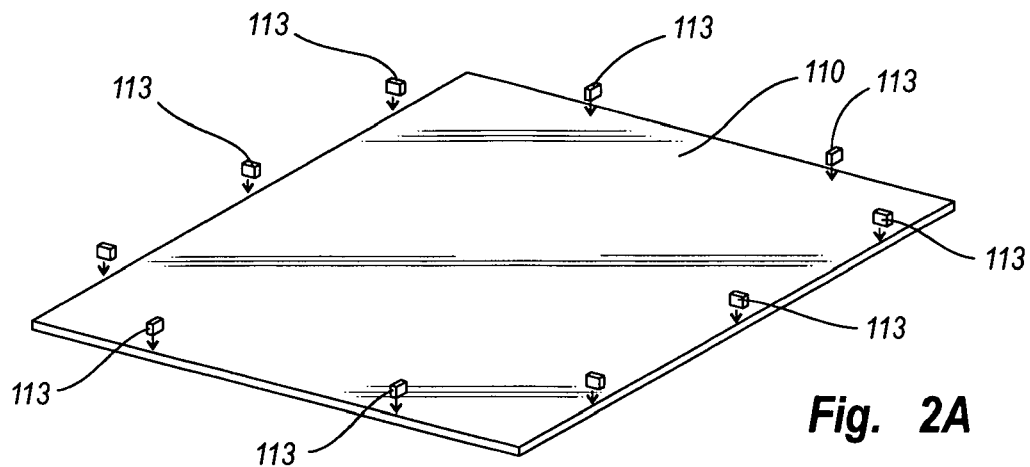
FIG. 2A illustrates an initial step in a method for creating the glass panel depicted in FIG. 1, in which one or more spacers are positioned on top of a first glass sheet.

In particular, FIG. 2A illustrates an initial step in a method for making the glass panel 100 depicted in FIG. 1, which comprises positioning a first glass sheet 110 upon a support surface (e.g., a table, work bench, a floor, etc.) The glass sheet 110 can be any thickness necessary to create a resulting thickness in the final glass panel 100 product. For example, a thinner glass panel 100 may be made from a ¹⁄₁₆, ⅛, or ¼ inch glass sheet 110, while a thicker glass panel 100 may be made from a ¼, ½, ¾, or even 1 inch glass sheet 110.

Once the first glass sheet 110 is in position, the manufacturer (i.e., operator, user, etc.) places one or more spacers 113 about its periphery. The spacers 113 are typically of a uniform size appropriate for the eventual size of the final glass panel 100, or for the size of the decorative objects 105. For example, a manufacturer can implement ½ inch tall spacers to make a thicker resin pour that will add bulk to the glass panel 100. Alternatively, the manufacturer can implement ⅛ inch tall spacers to suspend decorative objects that are no larger than 1/10 of an inch in any dimension. In other implementations, rather than discrete, individual spacers, a manufacturer may include a tape (or other adhesive) of an appropriate thickness about the periphery, and between the first and second glass sheets.

Figure 2B:
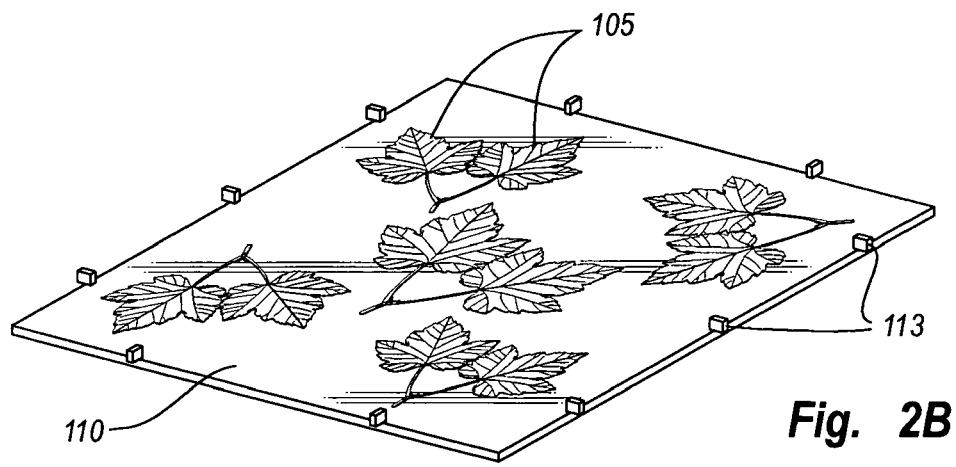
FIG. 2B illustrates a step in which one or more decorative objects are positioned on top of the first glass sheet.

After spacing the glass sheets, FIG. 2B shows that the manufacturer also positions one or more decorative objects 105 on the glass sheet 110. In some cases, these decorative objects 105 can be organic material, such as the depicted leaves, or other organic or inorganic items (not depicted). In the event of using organic matter (e.g., leaves), a manufacturer may desire to treat the organic matter (e.g., objects 105) prior to positioning it on the glass sheet 110. For example, some organic materials may react negatively (i.e., in terms of decorative or functional value) to the resin used in the glass panel 100. In particular, some resins can cause an organic material to change to an undesired color, while other resins can cause the organic material to emit moisture. Moisture emissions can have a detrimental effect on the glass panel 100, and can cause the resin 140 (see FIG. 3A) to be contaminated, which can cause cracking of the resin 140 and ultimately problems with the final glass panel 100.

One way to overcome such potential detrimental effects is to apply an effective amount of preserving resin, such as placing a UV-curable resin about the organic decorative objects 105 before placing them on the first glass sheet 110. In general, a preserving resin, such as a UV-curable resin, essentially "seals" the organic material from discoloration. The UV-curable resin can also seal the organic material from evacuating moisture, since the sealant creates a barrier between the organic material and the catalyst of the resin (i.e., resin 140, FIG. 3A) used to form the glass panel 100.

To apply the UV-curable resin in one implementation, the manufacturer dilutes the resin, and sprays it about the organic materials (i.e., decorative object 105) in a thin coat. The manufacturer then places the sprayed organic materials in a UV environment for a time sufficient to cure the resin (i.e., from a few minutes to about an hour), or until the organic materials are at least "tack-free". After the UV-curable resin has cured an appropriate amount of time about the decorative objects 105, the manufacturer then positions the decorative objects 105 on the first glass sheet 110. (For purposes of this implementation, a suitable resin includes ASTROCURE, a resin made by ZIRCON, although other resins may be suitable for use within the context of the present invention.)

Figure 2C:
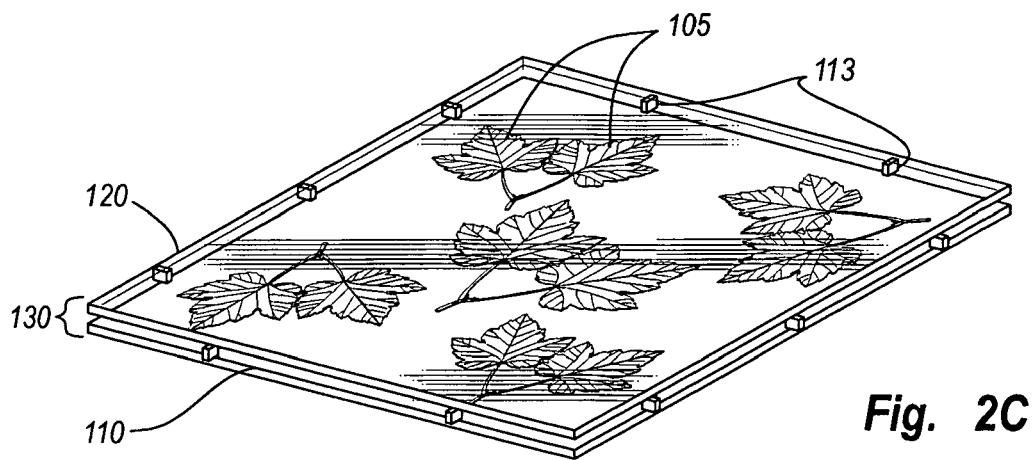
FIG. 2C illustrates a step in which a second glass sheet is registered about the first glass sheet in a glass sheet assembly.
Figure 2D:
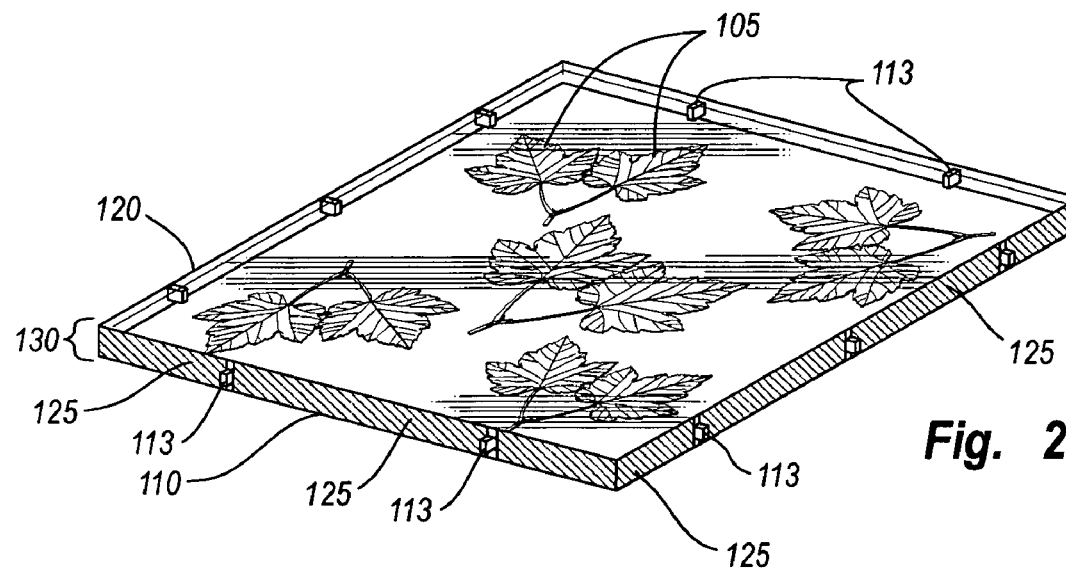
FIG. 2D illustrates a step in which blocking means are positioned about the glass sheet assembly.

As shown in FIG. 2C the manufacturer then registers a second glass sheet 120 about the first glass sheet 110, such that the spacers 113 and decorative objects 105 are positioned in between the first glass sheet 110 and the second glass sheet 120. When aligned appropriately, the shape dimensions of each glass sheet are also aligned, thus creating a glass sheet assembly 130. One will appreciate, of course, that the depicted glass sheet assembly 130 can be modified with additional layers of glass sheets and decorative objects as desired. As such, a "glass sheet assembly 130" refers generally to any two or more glass sheets (110, 120, etc.) appropriately positioned about a corresponding layer of one or more decorative objects 105.

When the manufacturer has appropriately prepared or aligned the relevant glass sheets 110, 120, spacers 113, and decorative objects 105 for each one or more layer of the glass sheet assembly 130, the manufacturer can position blocking means 125 about the plate assembly 130 periphery. Generally, the blocking means 125 comprise any means capable of providing a barrier between the resin (e.g., 140, FIG. 3A) used to form the glass panel 100 and a subsequently applied sealant (e.g., 135, FIG. 2E). This may be helpful in some implementations in which the resin (e.g., resin 140, FIG. 3A) used to adhere the glass sheets of the glass sheet assembly 130 together is discolored by the given sealant. As such, the blocking means 125 can comprise any number of resin or sealant-impermeable materials, such as conventional tape, plastic wrap, and so forth. The blocking means 125 are typically added in between each spacer 113, so that the given spacer 113 can later be removed.

Figure 2E:
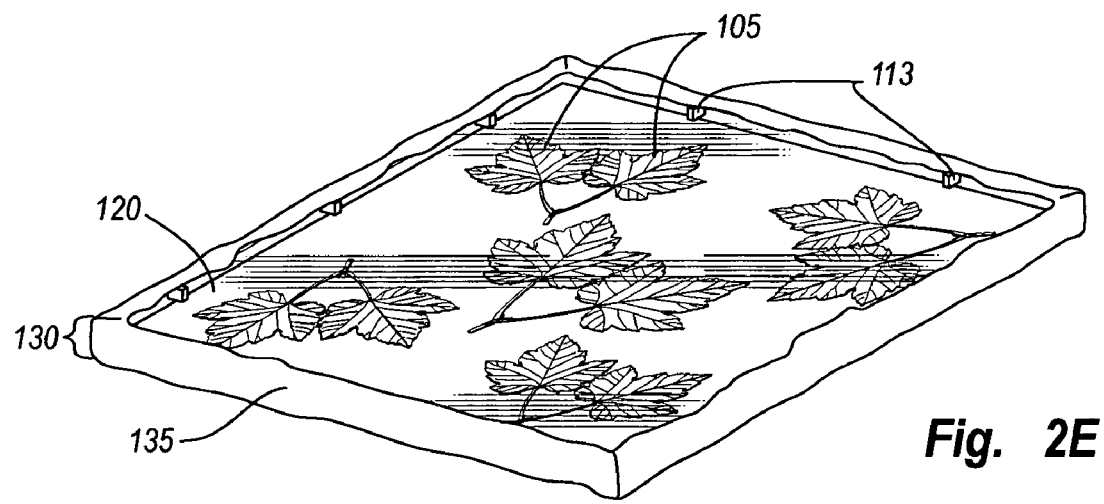
FIG. 2E illustrates a step in which a sealant is positioned about the glass sheet assembly.

Referring now to FIG. 2E, having added the blocking means 125, the manufacturer adds an effective amount of sealant 135 about the glass sheet assembly 130, wherein the sealant 135 is an outer layer to any blocking means 125. Some exemplary polyurethane sealants for use in accordance with this step include SIKAFLEX made by SIKA, DYNATROL made by PECORA, and DYMERIC made by TREMCO. Other silicone-based sealants, such as would be applied with a conventional caulking-type apparatus, can also be used in accordance with the present invention.

In any event, the sealant 135 provides an additional layer to prevent leakage of the resin 140, which is used to adhere the sheet assembly 130, as it is poured. The manufacturer then allows the glass sheet assembly 130 to set until the sealant 135 is at last "tack-free" to the touch. This setting period can take as much as about 24 hours, depending on the type of sealant 135 used.

Figure 3A:
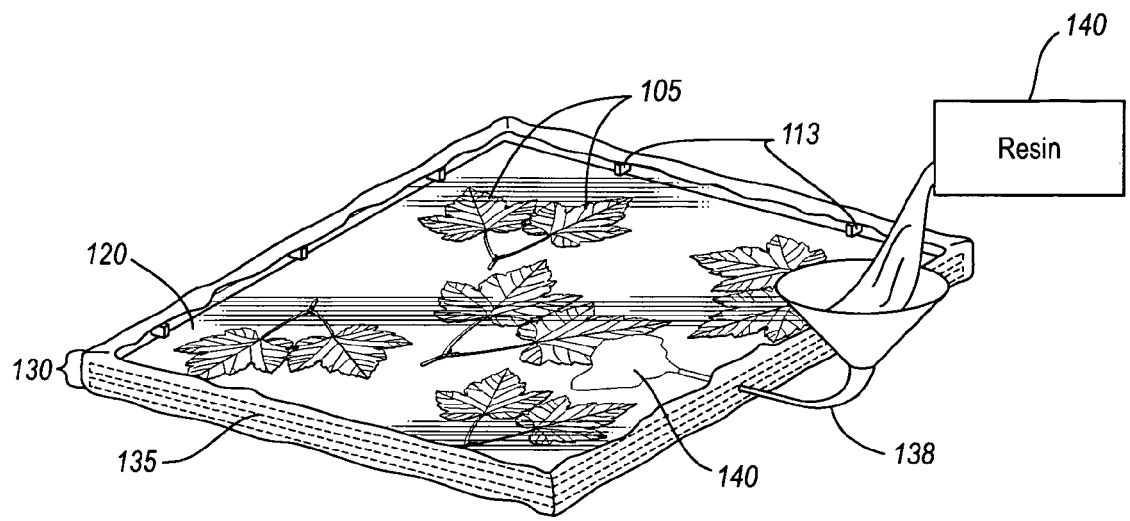
FIG. 3A illustrates a step in which a curable resin is poured into the glass sheet assembly using a substantially horizontal pour.
Figure 3B:
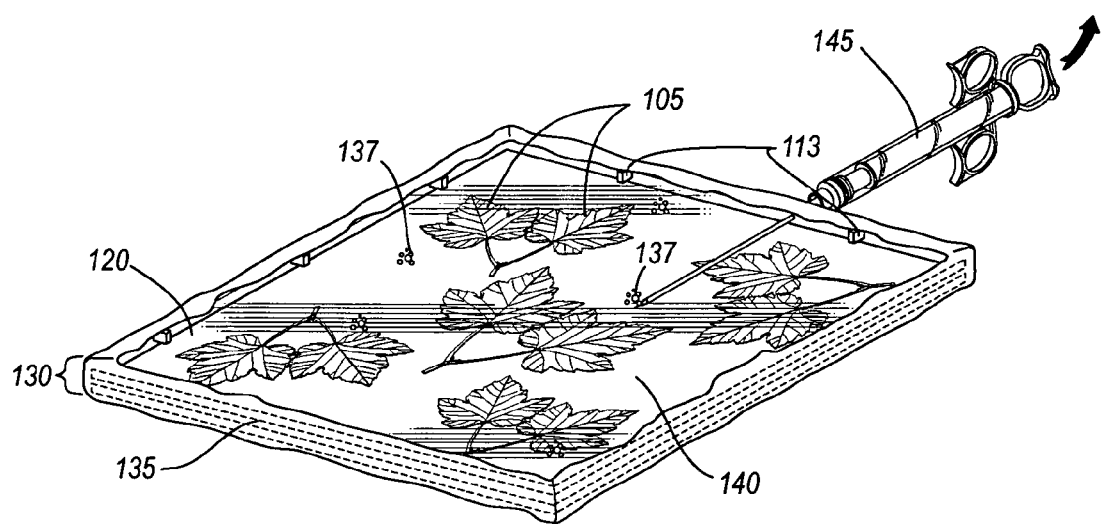
FIG. 3B illustrates a step for removing any air bubbles that may occur as a result of the substantially horizontal pour.

FIGS. 3A through 3B illustrate various processing steps for adding the liquid resin 140 to the glass sheet assembly 130, and for removing any air bubbles that might form inside. For example, as shown in FIG. 3A, the manufacturer can create one or more pores (not shown), and place a funnel 138 into the space between the first glass sheet 110, and the second glass sheet 120, via the one or more pores. The manufacturer can then pour the resin 140 through the funnel 138 into the cavity between the first glass sheet 110 and the second glass sheet 120. In one implementation, the resin 140 used to form the glass panel 100 is a liquid resin, such as ASTROCURE 1600G, made by ZIRCON, which cures in about 12 hours.

As illustrated in FIG. 3A, the manufacturer pours the resin 140 in a substantially horizontal fashion. That is, the manufacturer may lift the glass sheet assembly 130 slightly, and then pour the adhesive 140 into the glass sheet assembly 130 so that the liquid resin 140 nevertheless pours in through a roughly horizontal plane, albeit tilted sufficiently such that the resin fills the space between the first and second glass sheet based primarily on gravitational flow. Since the glass sheet assembly 130 is lifted only a moderate amount, the decorative objects 105 are not moved substantially out of position, compared with tilting the glass sheet assembly 130 into a substantially vertical position. Furthermore, tilting the glass sheet assembly 130, albeit slightly, allows any air bubbles 137 to move to one side or another of the sheet assembly 130, such that the air bubbles 137 are effectively out of view, or removed.

Alternatively, the manufacturer can place a tube or syringe on an opposing side of the glass sheet assembly 130 compared with the side in which the funnel 138 is positioned, in order to provide a vacuum force. In this implementation, the resin 140 flows through the funnel more quickly, due to the suction of the opposing syringe or tube. Furthermore, there is not necessarily any tilting of the glass sheet assembly 130, since the vacuum force may eliminate the need for gravitational flow in some cases. An implementation such as this may be useful in some cases where mass-production is desired, and where the glass sheet assembly 130 is very large.

In any event, notwithstanding any tilting, some air bubbles may still exist that must be removed before the resin 140 has fully cured. As shown in FIG. 3B, a manufacturer can remove these air bubbles by inserting a syringe 145 through the sealant 135, and into the space between the first and second glass sheets 110 and 120. The manufacturer can then pierce the air bubble 137 with a syringe 145 needle, and remove it, causing the liquid resin 140 to fill the remaining space. Thereafter, the manufacturer can place the glass sheet assembly 130 in an environment where the resin 140 can set until it is substantially cured.

Figure 3C:
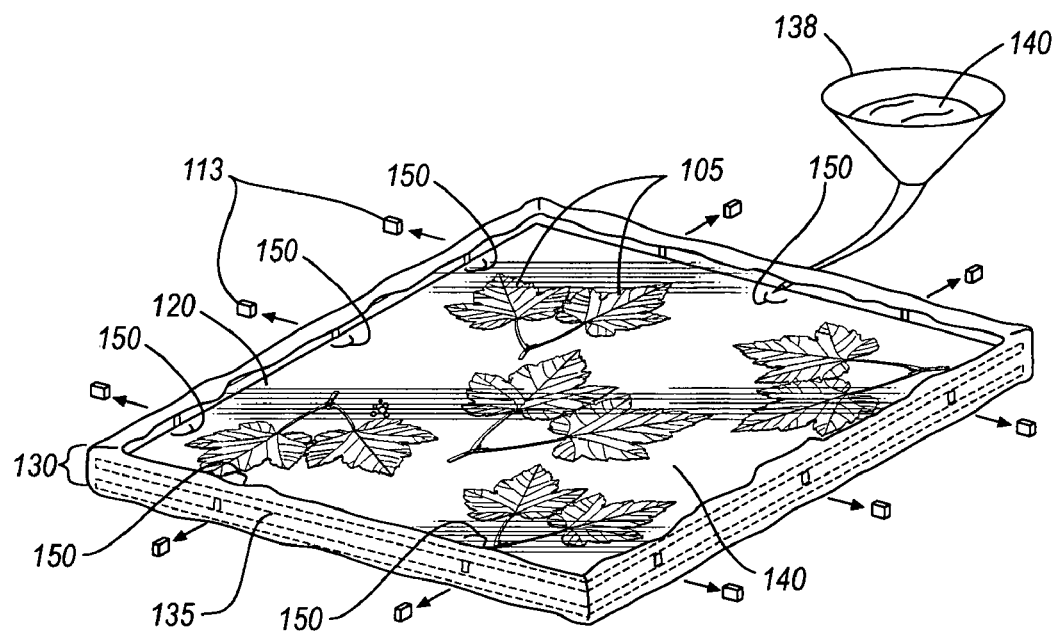
FIG. 3C illustrates a step for filling in gaps that result from removal of the one or more spacers depicted in FIG. 2A.
Figure 3D:
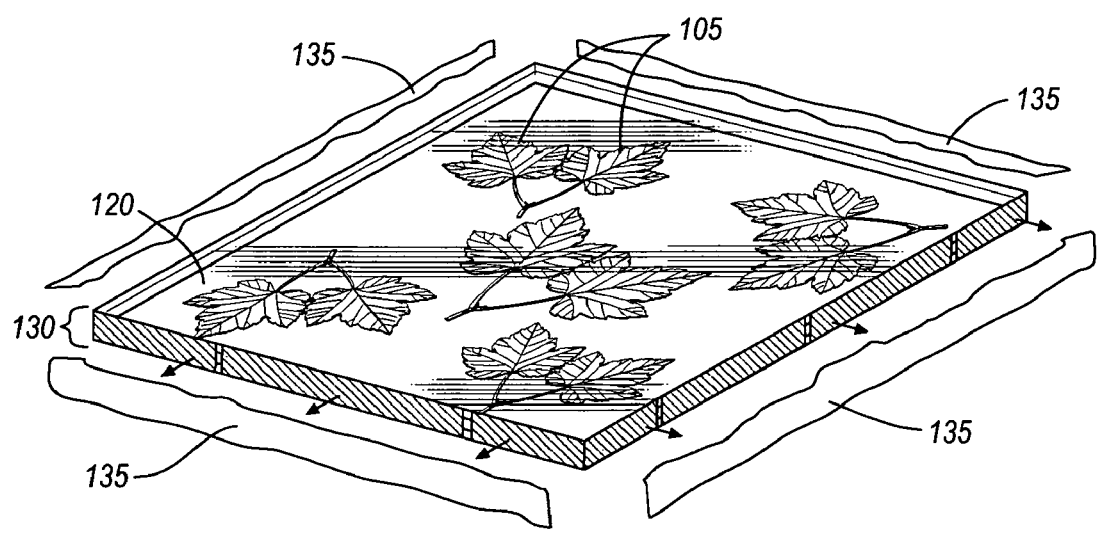
FIG. 3D illustrates a step in which the sealant depicted in FIG. 2E is removed from the glass sheet assembly.

FIGS. 3C-3D illustrate one or more finishing steps that can be useful to complete the glass panel 100 depicted in FIG. 1. For example, FIG. 3C shows that, when the resin 140 has solidified to a satisfactory degree (e.g., "gelled", or of a sufficiently solid matrix that the spacers 113 can be removed), the manufacturer removes the sealant 135 away from the glass sheet assembly 130. In one implementation, this initial cure time is about 3 hours for removing the spacers 113, although in other cases, the entire glass sheet assembly 130 cannot be moved at all for a period of 24 hours. The manufacturer then removes the one or more spacers 113 from between the first and second glass sheets 110, 120, causing the appearance of corresponding one or more resin cavities 150. In one implementation, this involves perforating the sealant 135 sufficiently to remove the corresponding one or more spacers 113. In some implementations, depending on the resin 140, it may be important to remove the spacers 113 before the resin 140 has fully cured, in order to avoid delamination. This is due in part to the case where the given resin 140 substantially shrinks in size as it cures.

FIG. 3C also shows that the manufacturer can then fill in the given cavities 150 with resin 140 (e.g., via syringe 145). In other implementations, the manufacturer may leave the resin cavities 150 if they will be covered by a frame, or may simply cut away that portion of the glass plate assembly 130 using an appropriate glass saw. In any event, the manufacturer awaits a sufficient cure time before performing any finishing steps. As indicated herein, the final cure time for a resin 140 comprising ASTROCURE 1600G is about 24 hours from the time of the initial pour (i.e., FIG. 3A). After a sufficient final cure time for the resin 140, FIG. 3D shows that the manufacturer may remove the sealant 135 from the glass panel assembly 130, and perform any remaining finishing steps. Such finishing steps can include removing the peripheral edges of the glass sheet assembly 130, framing the glass sheet assembly 130, texturing the glass sheet assembly 130, and so forth.

One will appreciate that the apparatus and method described herein can also be applied to a wide variety of glass panel 100 designs. For example, the manufacture can implement complex geometric patterns, such as curved glass sheets, by stacking the reciprocating patterns of the curved glass sheets together. The manufacturer can also modify the glass panel design with variations in the number or type of decorative items suspended in the resin 140. For example, the manufacturer may use synthetic materials, such as synthetic or silk leaves, orange slices, and so forth, in place of otherwise-naturally-occurring items.

The manufacture may also implement additional glass sheets in the sheet assembly 130, which allows the manufacturer to use as many as 2 or 3 more decorative object 105 layers. For example, a first decorative layer may comprise colored two-dimensional squares, a second decorative layer may comprise organic leaves, and a third decorative layer may comprise coffee beans. Accordingly, the inventive concepts described herein can be applied to several types of decorative architectural panels and designs.

In another implementation, the glass sheets 110 and 120 can be replaced with two or more resin sheets that comprise texturing on one or both sides. This may be useful when replacing glass sheets, since the textured surface of a given resin sheet can be lost in conventional thermosetting process. As such, a manufacturer may choose to use a first resin sheet having a textured surface on one side or both sides, a layer of resin and decorative objects as described herein, and a second resin sheet having a textured surface on an opposing one or more sides. Such a resin panel accordingly comprises one or more decorative objects in a resin panel having texturing on opposing sides.

In still a further implementation, the manufacturer may substitute any of the foregoing glass sheets 110, 120, etc. with relatively flexible glass sheets. As such, when a shrinking resin 140 begins to cure, the flexible glass sheets will bend toward each other, around the decorative objects 105 that have been placed inside. This can provide still further architectural options in accordance with the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come with the meaning and range of equivalency of the claims are to be embraced within their scope.

I claim:

1. A method of manufacturing a decorative architectural glass panel having a plurality of decorative objects suspended therein, comprising:

placing on a first glass sheet a plurality of spacers on each peripheral edge of the glass sheet;

placing a plurality of decorative objects between each peripheral edge of the glass sheet, wherein the plurality of spacers surround the plurality of decorative objects, and the plurality of decorative objects are different in dimension from the plurality of spacers;

registering a second glass sheet about the first glass sheet, wherein the plurality of spacers support the second glass sheet;

positioning blocking means between each of the plurality of spacers on an outside peripheral edge defined by the registered first and second glass sheets, wherein each outside peripheral edge is covered by the blocking means and the plurality of spacers are uncovered by the blocking means; and pouring a curable resin between the first and second glass sheets, wherein the plurality of decorative objects remain substantially-fixed in position on the first glass sheet;

determining that an initial cure time of the poured resin has occurred, wherein the poured resin has gelled; and removing each of the plurality of spacers from between the blocking means, wherein the blocking means remain in place, and a corresponding plurality of resin cavities are formed in the gelled resin.

2. The method as recited in claim 1, further comprising removing any oil residues from each side of at least one of the first and second glass sheets prior to placing the plurality of spacers.

3. The method as recited in claim 1, wherein the curable resin is poured using a substantially horizontal pour.

4. The method as recited in claim 1, further comprising providing a vacuum force on a side of the first and second glass sheets that is different from a side through which the curable resin is poured.

5. The method as recited in claim 1, wherein the plurality of decorative objects comprise organic matter, the method further comprising sealing the organic matter from discoloration or moisture emission.

6. The method as recited in claim 1, further comprising finishing the glass sheet assembly, such that the glass sheet assembly is suitable for use as a decorative glass panel.

7. The method as recited in claim 6, wherein finishing the glass sheet assembly comprises:
pouring additional curable resin into each of the one or more corresponding cavities left by the one or more spacers with curable resin, wherein each of the cavities are filled with the additional curable resin; and
at least one of:
removing one or more peripheral edges of the glass panel;
framing the one or more peripheral edges of the glass panel; or
texturing opposing sides of the glass panel.

8. The method as recited in claim 1, wherein the plurality of spacers define a uniform distance between the registered first and second glass sheets of ⅛ inch.

9. The method as recited in claim 1, further comprising filling the plurality of resin cavities with the curable resin.

10. The method as recited in claim 1, further comprising:
filling the plurality of resin cavities with additional curable resin; and
after all of the curable resin has cured between the first and second resin sheets, removing all of the blocking means.

11. The method as recited in claim 1, further comprising applying a polyurethane sealant around the peripheral edges of the first and second glass sheets, wherein the plurality of spacers and the blocking means are surrounded by the sealant.

12. A method of manufacturing a visually pleasing decorative glass laminate having a plurality of organic objects suspended therein, the method comprising:
positioning a plurality of organic objects between opposing first and second transparent glass sheets, wherein the opposing first and second glass sheets are separated by a distance defined by a plurality of spacers of uniform size;
positioning blocking means about each peripheral edge of the first and second glass sheets, and further surrounding the positioned blocking means and the plurality of spacers with an exterior sealant;
positioning a curable resin through the exterior sealant and through the blocking means, wherein the curable reins fills a cavity between the first and second glass sheets;
after an initial cure time has passed and the curable resin has gelled, perforating the sealant to remove the plurality of spacers, wherein the exterior sealant and blocking means remain in substantially the same position about the first and second resin sheets, and a plurality of cavities are formed in the gelled resin;
filling the plurality of resin cavities with additional curable resin; and
removing both the exterior sealant and the blocking means after the curable resin has completely cured.

13. The method as recited in claim 12, further comprising sealing the plurality of organic objects from discoloration using a UV-curable resin, the UV-curable resin being different from the curable resin positioned through the exterior sealant.

14. The method as recited in claim 12, further comprising positioning the blocking means about each peripheral edge of the resin sheets, wherein the blocking means is positioned in between each of the plurality of spacers.

15. The method as recited in claim 12, further comprising:
positioning one or more syringes through the sealant and between the first and second glass sheets; and
removing any air bubbles between the first and second glass sheets using the one or more syringes.

16. The method of manufacturing as recited in claim 12, wherein the blocking means are configured for providing a barrier between the curable resin and the sealant, wherein the curable resin and the sealant are substantially prohibited by the blocking means from reacting together.

17. The method of manufacturing as recited in claim 12, wherein positioning the blocking means comprises placing blocking means intermittently between the plurality of spacers.

18. The method as recited in claim 12, further comprising removing any oil residues from each side of at least one of the first and second glass sheets prior to placing the plurality of spacers.

19. The method as recited in claim 12, wherein the curable resin is positioned through the exterior sealant using a substantially horizontal pour.

20. The method as recited in claim 12, further comprising providing a vacuum force on a side of the first and second glass sheets that is different from a side through which the curable resin is positioned.

21. The method as recited in claim 12, further comprising sealing the plurality of organic objects from discoloration or moisture emission.

22. The method as recited in claim 12, further comprising finishing the glass sheet assembly, such that the glass sheet assembly is suitable for use as a decorative glass panel.

23. The method as recited in claim 22, wherein finishing the glass sheet assembly comprise at least one of;
removing one or more peripheral edges of the glass panel;
framing the one or more peripheral edges of the glass panel; or
texturing opposing sides of the glass panel.

* * * * *

UNITED STATES PATENT AND TRADEMARK OFFICE
CERTIFICATE OF CORRECTION

PATENT NO.        : 7,481,957 B1              Page 1 of 1
APPLICATION NO. : 11/242998
DATED             : January 27, 2009
INVENTOR(S)       : Eric Adickes It is certified that error appears in the above-identified patent and that said Letters Patent is hereby corrected as shown below:

Title Page
*Primary Examiner*, change "Monica A" to --Monica A.--
ABSTRACT, change "a two" to --two--

Column 4
Line 35, change "sixteen" to --16--

Column 6
Line 41, change "adhesive" to --resin--

Column 9
Claim 12, line 48, change "reins" to --resin--

Column 10
Claim 23, line 48, change "comprise" to --comprises--

Signed and Sealed this

Thirteenth Day of October, 2009

David J. Kappos
*Director of the United States Patent and Trademark Office*